United States Patent
Hashemzadeh et al.

(10) Patent No.: US 11,339,228 B2
(45) Date of Patent: May 24, 2022

(54) DISPERSION POWDER COMPOSITION CONTAINING VINYL ALCOHOL COPOLYMERISATE

(71) Applicant: WACKER CHEMIE AG, Munich (DE)

(72) Inventors: Abdulmajid Hashemzadeh, Burghausen (DE); Peter Brandmueller, Winhoering (DE); Walter Dobler, Tann (DE); Hardy Herold, Burghausen (DE)

(73) Assignee: Wacker Chemie AG, Munich (DE)

( * ) Notice: Subject to any disclaimer, the term of this patent is extended or adjusted under 35 U.S.C. 154(b) by 174 days.

(21) Appl. No.: 16/633,761

(22) PCT Filed: Jul. 24, 2017

(86) PCT No.: PCT/EP2017/068594
§ 371 (c)(1),
(2) Date: Jan. 24, 2020

(87) PCT Pub. No.: WO2019/020157
PCT Pub. Date: Jan. 31, 2019

(65) Prior Publication Data
US 2021/0122839 A1    Apr. 29, 2021

(51) Int. Cl.
*C08F 2/24*      (2006.01)
*C08F 220/58*    (2006.01)
*C08F 6/14*      (2006.01)
*C08F 216/06*    (2006.01)
*C08F 218/08*    (2006.01)

(52) U.S. Cl.
CPC .................. *C08F 2/24* (2013.01); *C08F 6/14* (2013.01); *C08F 216/06* (2013.01); *C08F 218/08* (2013.01); *C08F 220/585* (2020.02)

(58) Field of Classification Search
CPC .......... C08F 2/24; C08F 220/585; C08F 6/14; C08F 216/06; C08F 218/08
USPC ....................................................... 524/503
See application file for complete search history.

(56) References Cited

U.S. PATENT DOCUMENTS

| | | | |
|---|---|---|---|
| 6,300,403 B1* | 10/2001 | Mayer | C08F 2/24 524/459 |
| 6,350,808 B1 | 2/2002 | Schmitz et al. | |
| 8,217,109 B2 | 7/2012 | Weitzel et al. | |
| 2002/0198292 A1 | 12/2002 | Kayser et al. | |
| 2003/0032711 A1* | 2/2003 | Weitzel | C04B 40/0039 524/459 |
| 2007/0213430 A1* | 9/2007 | Bauer | C08F 8/44 524/5 |
| 2011/0288209 A1 | 11/2011 | Beck et al. | |
| 2014/0094542 A1 | 4/2014 | Faatz et al. | |
| 2014/0237847 A1 | 8/2014 | Herbert et al. | |

FOREIGN PATENT DOCUMENTS

| | | |
|---|---|---|
| EP | 1020493 A1 | 7/2000 |
| EP | 1148038 A1 | 10/2001 |
| EP | 1253157 A1 | 10/2002 |
| EP | 1400557 A1 | 3/2004 |
| EP | 1420033 B1 | 8/2004 |
| JP | 57209906 A | 12/1982 |
| JP | 10087937 A | 4/1998 |
| WO | 9916794 A1 | 4/1999 |
| WO | 2005035645 A2 | 4/2005 |
| WO | 2010091766 A1 | 8/2010 |
| WO | 2012159848 A1 | 11/2012 |
| WO | 2013017491 A1 | 2/2013 |

OTHER PUBLICATIONS

Dr. J. Schulze et al., Redispersionspulver im Zement, TIZ-Fachberichte, 1985, vol. 109, No. 9, p. 698.
T. G. Fox, Influence of Diluent and of Copolymer Composition on the Glass Temperature of a Polymer System, Bulletin of the American Physical Society, 1956, vol. 1, No. 3, p. 123, American Physical Society, New York.
J. Brandrup et al., Polymer Handbook, 2nd Edition, 1975, John Wiley & Sons, New York.

\* cited by examiner

*Primary Examiner* — Michael M. Bernshteyn
(74) *Attorney, Agent, or Firm* — Brooks Kushman P.C.

(57) ABSTRACT

Water-redispersible polymer powders with improved characteristics in building materials are prepared using a drying aid which is a polyvinyl alcohol copolymer also containing vinyl ester monomers and specific comonomers.

18 Claims, No Drawings

DISPERSION POWDER COMPOSITION CONTAINING VINYL ALCOHOL COPOLYMERISATE

CROSS REFERENCE TO RELATED APPLICATIONS

This application is the U.S. National Phase of PCT Appln. No. PCT/EP2017/068594 filed Jul. 24, 2017, the disclosure of which is incorporated in its entirety by reference herein.

BACKGROUND OF THE INVENTION

1. Field of the Invention

The invention relates to a dispersion powder composition containing vinyl alcohol copolymer, to a process for the production thereof, and to the use thereof.

2. Description of the Related Art

Water-redispersible polymer powders (dispersion powders) are polymer powders that are generally obtained by drying the corresponding aqueous polymer dispersions of the film-forming base polymer in the presence of a drying aid (generally a protective colloid). The protective colloid content prevents irreversible adhesion of the polymer particles during the drying process, since the polymer particles are encased by the water-insoluble protective colloid particles. Moreover, this protective colloid matrix, which redissolves when the polymer powder is dispersed in water, has the effect that the polymer particles are again present in the aqueous redispersion with the particle size of the original dispersion (TIZ-Fachberichte [Clay industry journal specialist reports], 1985, vol. 109 (9), 698).

The protective colloids used, for example in the process described in WO 2013/017491 A1, are usually polyvinyl alcohols. EP 1020493 A1 describes the use of a partially acetalized, water-soluble polyvinyl alcohol as a drying aid in the production of a water-redispersible polymer powder through spray-drying of the corresponding polymer dispersion. In WO 2012/159848 A1, fully saponified vinyl acetate-isopropenyl acetate copolymers are used as a protective colloid for stabilizing an aqueous polymer dispersion and as a drying aid for drying an aqueous polymer dispersion. EP 477900 A2 describes dispersion powder compositions comprising polyvinyl alcohol that still contain fully saponified vinyl acetate-1-methylvinyl acetate copolymers to improve the properties of building materials modified therewith. EP 1400557 A1 describes the use of a vinyl alcohol copolymer containing 1 to 12 mol % of ethylene units as a drying aid in the production of dispersion powders. In EP 1420033 B1, partially saponified vinyl acetate-ethylene copolymers are used as a protective colloid in the production of a copolymer dispersion and as a drying aid in the spray-drying of aqueous polymer dispersions.

Such dispersion powders are used primarily in chemical products for construction, for example in dry mortar formulations, which are made ready for use by adding water. In addition to dispersion powders, these dry mortar formulations also contain mineral binders such as cement and also fillers and optionally further additives. Such dry mortar formulations are mixed with water and the resulting mortar applied, for example as a tile adhesive, joint filler, spackling compound, render, screed or as sealing slurry.

It is important that these fresh mortars have good processing properties and that the resulting hardened mortar compositions have high mechanical strength and strong adhesion to different substrates.

In the case of one-component sealing slurries, in addition to being waterproof once hardened, low tackiness and high sag resistance are crucial during processing of the fresh mortar, especially when applying thicker layers. To optimize the waterproofness, dry mortar formulations for sealing slurries therefore include relatively large amounts of dispersion powders (up to 50% by weight based on the total weight of the dry mortar formulation). The presence in the dispersion powders of protective colloids, which are used as drying aids in the production of the powders by drying the corresponding aqueous polymer dispersions, results in an increase in the viscosity and tackiness of the mortar compounds, particularly when there are large amounts of dispersion powder in dry mortars.

Sealing slurries may be applied with, for example, a brush or roller. This necessitates a low viscosity in order that the slurry can be easily applied. Consequently, in this method of application, more water is used in the formulation, as a result of which, although the tackiness decreases very substantially, the application time is considerably higher, because many layers need to be applied before the minimum dry layer thickness of 2 mm prescribed in the standards, for example in DIN EN 14891, is obtained. What this means in practice is that application using a notched trowel is becoming increasingly common. To prevent the applied compound from running, special flow properties, i.e. good sag resistance, are necessary. Although increasing the viscosity of the mortar compound improves the sag resistance of the mortar, the tackiness increases also.

SUMMARY OF THE INVENTION

An object of the invention therefore was to provide a dispersion powder composition that, when used in the production of mortar compositions, improves sag resistance even when relatively large amounts are added, without this being accompanied by too high an increase in the tackiness of the mortar. These and other objects of a polyvinyl alcohol protective colloid also containing $C_{3-18}$ alkyl vinyl esters, and acid and/or quaternary ammonium-functional monomers or salts thereof.

DETAILED DESCRIPTION OF THE PREFERRED EMBODIMENTS

The invention thus provides water-redispersible polymer powder compositions (dispersion powder compositions) comprising vinyl alcohol copolymer; which are obtained through the free-radical polymerization of one or more ethylenically-unsaturated monomers in an aqueous medium in the presence of protective colloids and/or emulsifiers, and the drying of the resulting aqueous polymer dispersion after addition of protective colloid as a drying aid, characterized in that the polymerization and/or drying are carried out using as a protective colloid, one or more vinyl alcohol copolymers comprising a) 80 to 99 mol % of vinyl alcohol monomer units, b) 0.5 to 10 mol % of monomer units derived from vinyl esters of unbranched or branched alkyl carboxylic acids having 3 to 18 carbon atoms, c) 0.5 to 10 mol % of monomer units derived from ethylenically-unsaturated monomers having one or more functional groups selected from the group consisting of carboxylic acid moiety, sulfonic acid moiety, quaternized amine moiety, phosphoric acid moiety, and salts thereof, and d) 0 to 5 mol % of vinyl acetate monomer units, wherein the values in mol % in each case add up to 100 mol %.

The vinyl alcohol copolymers comprise a) 80 to 99 mol %, preferably 85 to 97 mol %, of vinyl alcohol monomer units, b) 0.5 to 10 mol %, preferably 1 to 8 mol %, of monomer units derived from vinyl esters of unbranched or branched alkyl carboxylic acids having 3 to 18 carbon atoms, c) 0.5 to 10 mol %, preferably 1 to 8 mol %, of monomer units derived from ethylenically-unsaturated monomers having one or more functional groups selected from the group consisting of carboxylic acid moiety, sulfonic acid moiety, quaternized amine moiety, phosphoric acid moiety, and salts thereof, and d) 0 to 5 mol %, preferably 1 to 4 mol %, of vinyl acetate monomer units, wherein the values in mol % in each case add up to 100 mol %.

Preferred vinyl esters of unbranched or branched alkyl carboxylic acids having 3 to 18 carbon atoms are vinyl propionate, vinyl butyrate, vinyl 2-ethylhexanoate, vinyl laurate, 1-methylvinyl acetate, and vinyl esters of α-branched monocarboxylic acid acids having 5 to 13 carbon atoms, for example vinyl pivalate, VeoVa9$^R$, VeoVa10$^R$ or VeoVa11$^R$ (tradenames of Hexion). Particularly preferred are the vinyl esters of α-branched monocarboxylic acids having 9 to 10 carbon atoms (VeoVa9$^R$ and VeoVa10$^R$).

Examples of ethylenically-unsaturated carboxylic acids suitable as monomers c) are acrylic acid, methacrylic acid, crotonic acid, itaconic acid, fumaric acid, maleic acid and the anhydride thereof, monoesters of fumaric acid or maleic acid such as the ethyl and isopropyl esters, or unsaturated fatty acids having 7 to 25 carbon atoms, and also the salts of these carboxylic acids. Preference is given to acrylic acid and methacrylic acid, maleic acid/anhydride, and crotonic acid, and to the salts of these carboxylic acids.

Monomers having a sulfonic acid group that are suitable as monomers c) are vinylsulfonic acid, styrenesulfonic acid, allylsulfonic acid, methallylsulfonic acid, p-methallyloxy-phenylsulfonic acid, and sulfonic acids of the general formula $CH_2=CR^1-CO-X-CR^2R^3-R^4-SO_3H$, where $X=O$ or $NH$, $R^1$, $R^2$, $R^3$ are identical or different and represent H and $C_1$ to $C_3$ alkyl, and $R^4$ represents $C_1$ to $C_4$ alkylene, and also the salts of these acids. Preference is given to vinylsulfonic acid, sulfopropyl (meth)acrylate, 2-acrylamido-2-methylpropanesulfonic acid and methally-lsulfonic acid, 1-allyloxy-2-hydroxysulfonic acid, 3-sulfopropyl acrylate, 3-sulfopropyl methacrylate, bis(3-sulfopropyl) itaconate, and the salts of these acids.

Monomers having a quaternized amine moiety that are suitable as monomers c) are diallyldimethylammonium chloride (DADMAC), diallyldiethylammonium chloride (DADEAC), (3-methacryloyloxy)propyltrimethylammonium chloride (MPTAC), (3-methacryloyloxy)ethyltrimethylammonium chloride (METAC), and (3-methacrylamido) propyltrimethylammonium chloride (MAPTAC).

Suitable monomers having a phosphoric acid moiety are vinylphosphonic acid and dimethyl vinylphosphonate, phosphoalkyl methacrylates such as phosphoethyl methacrylate and phosphopropyl methacrylate.

Most preferred as monomers c) are vinylsulfonic acid, 2-acrylamido-2-methylpropanesulfonic acid, and salts thereof.

Copolymerization with up to 5 mol % of additional reactive monomers from the group consisting of ethylenically-unsaturated monomers having an alkoxysilane group, epoxy group, amine group, or amide group, is optionally possible. Preference is given to vinyltriethoxysilane, vinyltris(2-methoxyethoxy)silane, vinyltriacetoxysilane, 3-methacryloyloxypropyltrimethoxysilane, glycidyl methacrylate, diacetone acrylamide, N-vinylformamide, and vinylamine.

The vinyl alcohol copolymers may be prepared in known manner by means of free-radical polymerization of vinyl acetate with the comonomers mentioned under b) and c) and subsequent hydrolysis of the vinyl acetate copolymers obtained. Preferably by bulk polymerization of the neat substance, emulsion polymerization, suspension polymerization or more preferably by polymerization in organic solvents, most preferably in alcoholic solution with monohydric, aliphatic alcohols having 1 to 4 carbon atoms or mixtures thereof as solvent. Examples of suitable solvents are methanol, ethanol, propanol, isopropanol and an ethanol-isopropanol mixture. The polymerization is carried out under reflux at a temperature of 35° C. to 100° C. Free-radical initiation is effected by addition of customary initiators. Examples of customary initiators are percarbonates such as cyclohexyl peroxydicarbonate, peresters such as t-butyl perneodecanoate or t-butyl peroxypivalate, peroxide initiators such as t-butyl hydroperoxide, diacyl peroxides such as dilauroyl peroxide, and azo initiators such as azo-bisisobutyronitrile (AIBN), 2,2'-azobis(4-methoxy-2,4-dimethylvaleronitrile). The monomers may be initially charged in full, be metered-in in full, or be initially charged in part with the remainder metered in after initiation of the polymerization. The initiator is preferably initially charged in part and the remainder in each case metered in subsequently. The molecular weight may be adjusted in a manner known to those skilled in the art through polymerization in the presence of chain transfer agents.

The saponification (transesterification, hydrolysis) of the vinyl acetate copolymer is carried out in a manner known per se, for example by the kneader process or in a stirred-tank reactor, preferably under alkaline conditions with the addition of base. The vinyl acetate copolymer is preferably present in an alcoholic solution with monohydric aliphatic alcohols having 1 to 4 carbon atoms or mixtures thereof as solvent. Particularly preferred are methanol and an ethanol/isopropanol mixture. The content of vinyl acetate copolymer in the solution is 20 to 85% by weight, preferably 30 to 80% by weight. The hydrolysis is preferably initiated using alkaline catalysts. Examples of these are the hydroxides, alkoxides, and carbonates of alkali metals or alkaline earth metals. Preference is given to sodium hydroxide. The alkaline catalysts are preferably used in alcoholic solution. Most preferred is a methanolic solution of NaOH. The alkaline catalyst is generally used in amounts from 0.2 to 20.0% by weight based on the vinyl acetate copolymer. The hydrolysis is generally carried out at temperatures of 40° C. to 90° C., preferably 50° C. to 85° C., generally in a stirred-tank reactor. Addition of the catalyst solution initiates the saponification. On reaching the desired degree of hydrolysis, the hydrolysis is quenched. The ester formed in the transesterification is preferably distilled off during the saponification reaction. In the preferred alkali-catalyzed hydrolysis, quenching is achieved by the addition of acidic reagents such as carboxylic acids or mineral acids, preferably acetic acid.

On completion of the saponification reaction, the solvent is distilled off, for example by means of steam stripping, and the vinyl alcohol copolymer is dissolved in water. The vinyl alcohol copolymer may also be separated from the liquid phase by precipitation or drying and isolated as a solid. As a drying aid in the drying of the aqueous polymer dispersion obtained by free-radical polymerization, the vinyl alcohol copolymer is preferably used in aqueous solution.

Suitable monomers for the production of the aqueous polymer dispersions of the base polymer are vinyl esters of unbranched or branched alkyl carboxylic acids having 1 to 15 carbon atoms, methacrylic esters and acrylic esters of alcohols having 1 to 15 carbon atoms, vinyl aromatic compounds, olefins, dienes or vinyl halides.

Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having 9 to 13 carbon atoms, for example VeoVa9® or VeoVa10® (trade names of Momentive). Particular preference is given to vinyl acetate.

Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate, and 2-ethylhexyl acrylate.

Examples of olefins and dienes are ethylene, propylene, and 1,3-butadiene. Suitable vinyl aromatic compounds are styrene and vinyltoluene. A preferred vinyl halide is vinyl chloride.

An additional 0.05 to 50% by weight of auxiliary monomers, preferably 1 to 10% by weight based on the total weight of the monomers, may optionally be copolymerized. Examples of auxiliary monomers are ethylenically-unsaturated mono- and dicarboxylic acids, preferably acrylic acid, methacrylic acid, fumaric acid, and maleic acid; ethylenically-unsaturated carboxamides and carbonitriles, preferably acrylamide and acrylonitrile; mono- and diestere of fumaric acid and maleic acid such as the diethyl and diisopropyl esters, and also maleic anhydride, ethylenically-unsaturated sulfonic acids and salts thereof, preferably vinylsulfonic acid, 2-acrylamido-2-methylpropanesulfonic acid. Further examples are precrosslinking comonomers such as polyethylenically-unsaturated comonomers, for example divinyl adipate, diallyl maleate, allyl methacrylate or triallyl cyanurate, or postcrosslinking comonomers, for example acrylamidoglycolic acid (AGA), methyl methylacrylamidoglycolate (MAGME), N-methylolacrylamide (NMA), N-methylolmethacrylamide (NMMA), N-methylol allylcarbamate, alkyl ethers such as the isobutoxy ether or esters of N-methylolacrylamide, of N-methylolmethacrylamide and of N-methylol allylcarbamate. Also suitable are epoxide-functional comonomers such as glycidyl methacrylate and glycidyl acrylate. Further examples are silicon-functional comonomers such as acryloyl oxypropyltrialkoxysilanes and methacryloyloxypropyltrialkoxysilanes such as methacryloyloxypropyltrimethoxysilane, vinyltrialkoxysilanes and vinylmethyldialkoxysilanes such as vinyltrimethoxysilane or vinyltriethoxysilane or vinylmethyldimethoxysilane, in which the alkoxy groups may be present in the form of, for example, methoxy, ethoxy, and ethoxypropylene glycol ether radicals.

Also included are monomers having hydroxy or CO groups, for example hydroxyalkyl esters of methacrylic acid and acrylic acid such as hydroxyethyl, hydroxypropyl or hydroxybutyl acrylate or methacrylate and also compounds such as diacetone acrylamide and acetylacetoxyethyl acrylate or methacrylate. Further suitable comonomers are vinyl alkyl ethers, for example vinyl methyl ether, vinyl ethyl ether, vinyl isobutyl ether, vinyl octadecyl ether.

Examples of homo- and copolymers suitable as the base polymer are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styrene-1,3-butadiene copolymers.

Preference is given to vinyl acetate homopolymers; copolymers of vinyl acetate with 1 to 40% by weight of ethylene;

copolymers of vinyl acetate with 1 to 40% by weight of ethylene and 1 to 50% by weight of one or more further comonomers from the group consisting of vinyl esters having 3 to 15 carbon atoms in the carboxylic acid moiety, such as vinyl propionate, vinyl dodecanoate, vinyl esters of alpha-branched carboxylic acids having 9 to 13 carbon atoms such as VeoVa9®, VeoVa10®, VeoVa11®;

copolymers of vinyl acetate with 1 to 50% by weight of one or more further comonomers from the group consisting of vinyl esters having 3 to 15 carbon atoms in the carboxylic acid moiety, such as vinyl propionate, vinyl dodecanoate, vinyl esters of alpha-branched carboxylic acids having 9 to 13 carbon atoms such as VeoVa9®, VeoVa10®, VeoVa11®;

copolymers of vinyl acetate, 1 to 40% by weight of ethylene, and preferably 1 to 60% by weight of acrylic esters of unbranched or branched alcohols having 1 to 15 carbon atoms, in particular n-butyl acrylate or 2-ethylhexyl acrylate; copolymers of 30 to 75% by weight of vinyl acetate, 1 to 30% by weight of vinyl laurate or vinyl esters of an alpha-branched carboxylic acid having 9 to 13 carbon atoms, and also 1 to 30% by weight of acrylic esters of unbranched or branched alcohols having 1 to 15 carbon atoms, in particular n-butyl acrylate or 2-ethylhexyl acrylate, which optionally may contain an additional 1 to 40% by weight of ethylene;

copolymers of vinyl acetate, 1 to 40% by weight of ethylene, and 1 to 60% by weight of vinyl chloride;

copolymers of one or more vinyl esters having 1 to 12 carbon atoms in the carboxylic acid moiety such as vinyl acetate, vinyl propionate, vinyl laurate, vinyl esters of alpha-branched carboxylic acids having 5 to 13 carbon atoms such as VeoVa9$^R$, VeoVa10$^R$, VeoVa11$^R$, 1 to 40% by weight of ethylene and 1 to 60% by weight of vinyl chloride;

wherein said auxiliary monomers may in each case be additionally copolymerized in the stated amounts and wherein the values in % by weight each add up to 100% by weight.

Preference is also given to (meth)acrylic ester polymers such as copolymers of n-butyl acrylate or 2-ethylhexyl acrylate or copolymers of methyl methacrylate with n-butyl acrylate and/or 2-ethylhexyl acrylate and optionally ethylene; styrene-(meth)acrylic ester copolymers of one or more monomers from the group consisting of methyl acrylate, ethyl acrylate, propyl acrylate, n-butyl acrylate, 2-ethylhexyl acrylate; vinyl acetate-(meth)acrylic ester copolymers of one or more monomers selected from the group consisting of methyl acrylate, ethyl acrylate, propyl acrylate, n-butyl acrylate, 2-ethylhexyl acrylate, and optionally ethylene;

copolymers of styrene and 1,3-butadiene;

wherein said auxiliary monomers may in each case be additionally copolymerized in the stated amounts and wherein the values in % by weight each add up to 100% by weight.

The monomer selection and the selection of the proportions by weight of the comonomers is generally made so as to result in a glass transition temperature Tg of −50° C. to +50° C., preferably −10° C. to +30° C. The glass transition temperature Tg of the polymers can be determined in a known manner by means of differential scanning calorimetry (DSC). The approximate Tg can also be predetermined using the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (wt.-%/100) of the monomer n and $Tg_n$ is the glass transition temperature in kelvins of the homopolymer of monomer n. Tg values for homopolymers are listed in Polymer Handbook 2nd Edition, J. Wiley & Sons, New York (1975).

The homopolymers and copolymers are preferably produced by the emulsion polymerization process, in which the polymerization temperature is generally, but not necessarily, <100° C.

The polymerization may be carried out independently of the polymerization process with or without the use of seed latices, with all or individual constituents of the reaction mixture initially charged, or with them initially charged in part and with subsequent addition of the reaction mixture or of individual constituents thereof, or according to the metering process with no initial charge. In the production of the dispersion, the comonomers may all be initially charged (batch process) or the monomers may be initially charged in part, with metering of the remainder (semibatch process).

The polymerization is initiated with the water-soluble initiators or redox initiator combinations that are customary for emulsion polymerization. Examples of water-soluble initiators are the sodium, potassium and ammonium salts of peroxodisulfuric acid, hydrogen peroxide, tert-butyl hydroperoxide, potassium peroxodiphosphate, cumene hydroperoxide, isopropylbenzene monohydroperoxide. The recited initiators are generally used in an amount of from 0.001 to 0.02% by weight, preferably 0.001 to 0.01% by weight, in each case based on the total weight of the monomers. Redox initiators used are combinations of the recited initiators in combination with reducing agents. Suitable reducing agents are the sulfites and bisulfites of the alkali metals and of ammonium, for example sodium sulfite, the derivatives of sulfoxylic acid such as the zinc or alkali metal salts of formaldehyde sulfoxylate, for example sodium hydroxymethanesulfinate, ascorbic acid, and mixtures of the salts of 2-hydroxy-2-sulfinatoacetic acid and 2-hydroxy 2-sulfonatoacetic acid with sodium sulfite. The amount of reducing agent is generally from 0.001 to 0.03% by weight, preferably 0.001 to 0.015% by weight, in each case based on the total weight of the monomers.

Chain transfer agents may be used to control the molecular weight during the polymerization. If such agents are used, they are normally used in amounts of between 0.01 to 5.0% by weight based on the monomers undergoing polymerization and are metered in separately or else premixed with reaction components. Examples of such agents are n-dodecyl mercaptan, tert-dodecyl mercaptan, mercaptopropionic acid, methyl mercaptopropionate, isopropanol, and acetaldehyde.

The polymerization preferably takes place in the presence of protective colloid. Suitable protective colloids are the vinyl alcohol copolymers according to the invention, polyvinyl alcohols, polyvinyl acetals, polyvinylpyrrolidones, polysaccharides in water-soluble form, such as starches (amylose and amylopectin), celluloses and the methyl, hydroxyethyl, hydroxypropyl derivatives thereof, poly (meth)acrylamide.

As protective colloids in the polymerization, preference is given to partially saponified or fully saponified polyvinyl alcohols having a degree of hydrolysis of 80 to 100 mol %, in particular partially saponified polyvinyl alcohols having a degree of hydrolysis of 80 to 95 mol % and a Höppler viscosity in 4% aqueous solution of 1 to 30 mPas (Höppler method at 20° C., DIN 53015). Preference is also given to partially saponified, hydrophobically modified polyvinyl alcohols having a degree of hydrolysis of 80 to 95 mol % and a Höppler viscosity in 4% aqueous solution of 1 to 30 mPas. Examples of these are partially saponified copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 13 carbon atoms, dialkyl maleates and dialkyl fumarates such as diisopropyl maleate and diisopropyl fumarate, vinyl chloride, vinyl alkyl ethers such as vinyl butyl ether, olefins such as ethene and decene. The proportion of hydrophobic units is preferably 0.1 to 10% by weight based on the total weight of the partially saponified polyvinyl alcohol. It is also possible to use mixtures of the recited polyvinyl alcohols.

Most preferred are partially saponified polyvinyl alcohols having a degree of hydrolysis of 85 to 94 mol % and a Höppler viscosity in 4% aqueous solution of 3 to 15 mPas (Höppler method at 20° C., DIN 53015). The recited protective colloids are obtainable by processes known to those skilled in the art and, in the polymerization, are generally added in a total amount of 1 to 20% by weight based on the total weight of the monomers.

It is optionally also possible to use mixtures of the recited preferred protective colloids with in each case the vinyl alcohol copolymer according to the invention.

The polymerization may also be carried out in the presence of nonionic emulsifier or in the presence of one or more of the recited protective colloids in combination with nonionic emulsifier. Suitable nonionic emulsifiers are surfactants such as alkyl polyglycol ethers or alkylaryl polyglycol ethers having 8 to 40 alkylene oxide units. Preference is given to alkoxylated $C_8$ to $C_{16}$ alkanols that are alkoxylated with $C_2$ to $C_4$ alkylene oxides, in particular ethylene oxide and propylene oxide or mixtures thereof. In the polymerization, the nonionic emulsifiers are generally added in an amount of 0.05 to 10% by weight based on the total weight of the monomers.

Preferably, only protective colloid is used for stabilization during the polymerization.

On completion of the polymerization, residual monomers may be removed by postpolymerization according to known methods, generally by postpolymerization initiated by a redox catalyst. Volatile residual monomers may also be removed by distillation, preferably under reduced pressure, and optionally by passing air or steam or inert entrained gases such as nitrogen over or through the polymerization mixture. The aqueous dispersions thus obtainable have a solids content of 30 to 75% by weight, preferably of 50 to 60% by weight.

In the production of water-redispersible polymer powders, the aqueous polymer dispersions of the base polymer are dried after addition of one or more protective colloids as a drying aid. Protective colloids suitable for this purpose are the protective colloids already mentioned above as being suitable for the polymerization. Preference is given to the use of one or more of the vinyl alcohol copolymers according to the invention as drying aid. Embodiments in which the vinyl alcohol copolymers according to the invention are used only as drying aid and not in the polymerization are particularly preferred. The drying aid is generally used in a total amount of 0.1 to 20% by weight, preferably 1 to 7% by weight, in each case based on the total weight of the polymeric constituents of the aqueous dispersion of the base polymer.

Drying is carried out by means of, for example, fluidized-bed drying, freeze drying or spray drying. The polymer dispersions are preferably spray-dried. Spray drying is carried out in conventional spray drying systems, in which atomization may be achieved using one-phase, two-phase or multiphase nozzles or using a rotating disk. An outlet temperature in the range from 45° C. to 120° C., preferably 60° C. to 90° C., depending on the system and desired degree of drying, is generally chosen.

During drying, a content of up to 2% by weight of anitfoam based on the total weight of the polymeric constituents of the aqueous dispersion of the base polymer has proven favorable in many instances. To increase the storage stability by improving stability to blocking, particularly in powders having a low glass transition temperature, the resulting powder may be provided with an antiblocking agent (anticaking agent), preferably at up to 30% by weight based on the total weight of the polymeric constituents of the aqueous dispersion of the base polymer. Examples of antiblocking agents are calcium carbonate or magnesium carbonate, talc, gypsum, silica, kaolins, metakaolins, silicates having particle sizes preferably in the range from 10 nm to 100 μm.

The viscosity of the mixture to be atomized and dried may be adjusted via the solids content so as to obtain a value of <1000 mPas (Brookfield viscosity at 20 rpm and 23° C.), preferably <500 mPas, most preferably <250 mPas. The solids content of the mixture to be atomized should be >30% by weight, preferably >40% by weight.

To improve the performance properties, further additives may be added before, during or after drying. Examples of further constituents of dispersion powder compositions contained in preferred embodiments are pigments, fillers, foam stabilizers, hydrophobing agents, plasticizers.

In a particularly preferred embodiment, a silica sol is added to the aqueous polymer dispersions of the base polymer before or during drying. Silica sols are aqueous solutions or aqueous suspensions of silica ($SiO_2$) particles. Silica sols include colloidal silica, water glass or silica sol. The amount added is generally 0.1 to 10% by weight, with % by weight values being based on the solids content of the silica sols and on the total weight of the polymeric constituents of the aqueous dispersion of the base polymer.

The dispersion powder compositions according to the invention may be used in their typical fields of application. The dispersion powder compositions are used for modifying building compounds based on mineral binders, for example cement, plaster or lime mortar. Examples of mineral binders are cements such as Portland cement, aluminate cement, trass cement, slag cement, magnesia cement, phosphate cement, plaster such as calcium sulfate hemihydrate in the form of building plaster, stucco or model plaster and/or lime such as slaked lime. In addition to the mineral binder, the building compounds also contain fillers such as sands, for example quartz sand or quartz powder, gravels, chalks, dolomite, light spar, in each case in the grain size and quantity customary for the respective use. Further examples of fillers are fibers such as acrylate, polyethylene or cellulose fibers. Other additives that are customary in the composition of building compounds are thickeners, for example organic thickeners such as cellulose ethers and inorganic thickeners such as bentonite, pigments, wetting agents, dispersing agents, preservatives, antifoams, film-forming agents, antifreezes.

The dispersion powder compositions are preferably used in the production of sealing slurries, building adhesives, in particular tile adhesives or adhesives in heat-insulation composite systems, renders, spackling compounds, floor-filling compounds, leveling compounds, jointing mortars, repair mortars or crack-bridging renders. Most preferred is use in sealing slurries.

An example of a dry mortar formulation typical of a sealing slurry (with no dispersion powder fraction) is: 10 to 50 parts by weight of cement, 10 to 50 parts by weight of quartz sand, 1.0 to 10 parts by weight of fibers, 0.1 to 1.0% parts by weight of cement plasticizer, 0.1 to 1.0 parts by weight of defoamer.

The dispersion powder compositions are preferably used in an amount of from 5 to 50% by weight, in each case based on the total weight of the dry mortar formulations. The ready-to-use mortar is produced by stirring with water, with the measured amount of water preferably being such that 25 to 60 parts by weight of water are used per 100 parts by weight of dry formulation.

Further possible applications result from use in the field of adhesives and coatings, in the latter case, for example, as a coating composition for paper and textile.

The dispersion powder compositions may also be used as binders for sand, optionally in combination with mineral binders, for example for consolidation of joint sand or for the consolidation of the surfaces of sand roads or gravel surfaces.

The following examples serve to further illustrate the invention:

Preparation of the Vinyl Alcohol Copolymer:

A 70 liter reactor fitted with a stirrer and condenser was charged with the following substances:

| | |
|---|---:|
| Methanol | 12 660 g |
| t-Butyl peroxypivalate (PPV, 75% solution) | 31 g |
| Vinyl ester of Versatic acid$^R$ 10 (VeoVa$^R$10) | 177 g |
| Vinyl acetate | 3290 g |
| Vinyl sulfonate (25% solution) | 233 g |

The solution was heated at 60° C. and polymerized for 30 minutes while stirring under a nitrogen atmosphere. The following substances were then metered in:

An initiator solution of 125 g of PPV in 1880 g of methanol was metered in over 240 minutes.

A monomer mixture 1 comprising 999 g of VeoVa$^R$ 10 and 18 661 g of vinyl acetate was metered in over an addition time of 180 minutes.

Monomer solution 2, 1319 g of a 25% aqueous solution of vinyl sulfonate, was added over a metering time of 195 minutes.

At the end of the metered addition, the reactor was sealed, the pressure in the reactor increased to 0.2 bar and postpolymerization was carried out at 100° C. for one hour. The polymer solution was then cooled to 30° C. and diluted with methanol to a 31% by weight solution. The polymer solution was blanketed with 38 440 g of methanol, without stirring, and a mixture of 775 g of methanol and 657 g of 46% sodium hydroxide solution was then added with stirring. After two hours, the solution was neutralized with 342 g of acetic acid (99.8%).

Methanol and by-products were then removed by steam stripping. After stripping, the vinyl alcohol copolymer was taken up in water and diluted to a 20% by weight solution.

A copolymer containing 94.5 mol % of vinyl alcohol monomer units, 2.1 mol % of vinyl acetate monomer units, 2.3 mol % of VeoVa$^R$10 monomer units, and 1.1 mol % of vinylsulfonic acid monomer units was obtained.

Production of the Dispersion Powders:

Dispersion Powder 1:

40 kg of an aqueous polymer dispersion (vinyl acetate-ethylene copolymer, Tg of −15° C., solids content 55%, stabilized with polyvinyl alcohol (Höppler viscosity of 5 mPa·s, degree of hydrolysis of 88 mol %)) was mixed with 4.2 kg of an aqueous solution of a polyvinyl alcohol (Höppler viscosity of 13 mPa·s, degree of hydrolysis of 88 mol %; solids content 10%) and with 4 kg of an aqueous solution of the vinyl alcohol copolymer (solids content 20%) and with 8 kg of water.

The resulting dispersion was sprayed by means of a two-phase nozzle. The atomization component employed was 4 bar of compressed air. The droplets formed were dried in co-current flow with air heated at 125° C. The dry polymer powder was mixed with 18% by weight of a commercially available antiblocking agent (mixture of calcium carbonate and kaolin).

Dispersion Powder 2:

The procedure was analogous to the production of dispersion powder 1, with the difference that an additional 1 kg of silica sol (Bindzil 2040, trade name of Ekanobel, solids content 40%) was added before drying.

Dispersion Powder 3 (Comparison):

The procedure was analogous to the production of dispersion powder 1, with the difference that, instead of the aqueous solution of the vinyl alcohol copolymer, 4 kg of an aqueous solution of a polyvinyl alcohol (Höppler viscosity of 4 mPa·s, degree of hydrolysis of 88 mol %; solids content 20%) was added before drying.

Dispersion Powder 4 (Comparison):

The procedure was analogous to the production of dispersion powder 3, with the difference that an additional 1 kg of silica sol (Bindzil 2040, trade name of Ekanobel, solids content 40%) was added before drying.

Production and Testing of the Mortar Compounds:

For the production of the coating composition, the individual constituents of the formulation shown in table 1 were placed into a Toni mixer (commercial laboratory mixer) in the following order with mixing:

First, the inorganic binders (cements and anhydrite), then the fillers, then the respective dispersion powder, and finally the other additives.

The mixture was then mixed homogeneously for 15 minutes.

The resulting dry mixture was used to produce, in accordance with EN 196-1, the aqueous coating composition having a water-solids factor of 0.265.

TABLE 1

| Substance | wt. % |
|---|---|
| Portland cement (Milke Premium 52.5 R) | 10 |
| Aluminate cement (Ciment Fondu Kerneos) | 10 |
| Anhydrite (Casonic 95/45) | 1.5 |
| Omyacarb AL 15 (carbonate-type filler) | 6.5 |
| Sand (F 35 Quarzwerke; silicate-type filler) | 36.1 |
| Poraver 0.1-0.3 mm (light filler) | 3.5 |
| Defoamer (Agitan P 840) | 0.5 |
| Tartaric acid (retarder) | 0.6 |
| Lithium carbonate (accelerator) | 0.5 |
| Bärophob NBL (hydrophobing agent) | 0.3 |

TABLE 1-continued

| Substance | wt. % |
|---|---|
| Tylovis SE 7 (starch ether) | 0.1 |
| Rheolate 101 (acrylate associative thickener) | 0.4 |
| Dispersion powder | 30 |
| Water at 265 ml per kg of dry mixture | |

Application Testing:

The coating mortars thus obtained were each applied with a smoothing trowel to a vertical concrete slab as a thin layer of mortar, as described in EN 1348. A notched trowel having notches of 8 mm×8 mm was then used to apply the coating mortar so as to form ribs running horizontally from left to right.

In order to be able to ensure a defined wet-layer thickness after smoothing the ribs with the smoothing trowel, it is crucial that the ribs are stable, i.e. they must not sag, let alone run.

The stability was rated qualitatively using a grading system from 1 to 6. The rating system ranges from 1=no change in the ribs and no rounding of the edges to 6=the mortar runs.

The results of the evaluation are summarized in table 2:

TABLE 2

| | Powder | Stability (grading 1-6) |
|---|---|---|
| Example 1 | Dispersion powder 1 | 3 |
| Example 2 | Dispersion powder 2 | 2 |
| Comp. example 3 | Dispersion powder 3 | 6 |
| Comp. example 4 | Dispersion powder 4 | 5 |

When applying the coating mortar to form the ribs, the spreadability was also assessed.

The spreadability was rated qualitatively using a grading system from 1 to 6. The rating system ranges from 1=spreads outstandingly easily without noticeable resistance when combing into ribs to 6=very viscous, spreads only with difficulty and with application of force.

Finally, the tackiness on stirring the coating mortar with the trowel and spreading it on the substrate was qualitatively assessed using a rating system from 1=no noticeable tackiness to 6=extremely tacky behavior.

The results are summarized in table 3.

TABLE 3

| Experiment | Spreadability (grading 1-6) | Tackiness (grading 1-6) |
|---|---|---|
| Example 1 | 1 | 2 |
| Example 2 | 2 | 2 |
| Comp. example 3 | 5 | 5 |
| Comp. example 4 | 6 | 6 |

The use of the inventive vinyl alcohol copolymer as drying aid (example 1 and example 2) resulted in dispersion powders that, in mortar formulations, surprisingly improved both the stability of the coating mortar enhanced therewith (table 2) and the processability thereof (table 3: low tackiness and high smoothness while being spread).

The invention claimed is:

1. A water-redispersible polymer powder composition, comprising:
    particles of a base polymer, and
    at least one vinyl alcohol copolymer,
    the water-redispersible polymer powder obtained through the free-radical polymerization in an aqueous medium of one or more ethylenically-unsaturated monomers to form base polymer particles in the presence of a protective colloid and/or emulsifier followed by drying the resulting aqueous polymer dispersion after addition of a protective colloid as a drying aid, wherein
    the drying is carried out with a protective colloid of one or more vinyl alcohol copolymers comprising a) 80 to 99 mol % of vinyl alcohol monomer units, b) 0.5 to 10 mol % of monomer units derived from vinyl esters of unbranched or branched alkyl carboxylic acids having 3 to 18 carbon atoms, c) 0.5 to 10 mol % of monomer units derived from ethylenically-unsaturated monomers having one or more functional groups selected from the group consisting of carboxylic acid moieties, sulfonic acid moieties, quaternized amine moieties, phosphoric acid moieties, salts thereof, and mixtures thereof, and d) 0 to 5 mol % of vinyl acetate monomer units, wherein the values in mol % in each case add up to 100 mol %.

2. The water-redispersible polymer powder composition of claim 1, wherein the vinyl alcohol copolymer includes monomer units b) derived from a vinyl ester of α-branched monocarboxylic acids having 9 to 10 carbon atoms.

3. The water-redispersible polymer powder composition of claim 2, wherein the vinyl alcohol copolymer includes monomer units c) derived from vinylsulfonic acid, 2-acrylamido-2-methylpropanesulfonic acid, and salts thereof.

4. The water-redispersible polymer powder composition of claim 1, wherein the vinyl alcohol copolymer includes d) 1 to 4 mol % of vinyl acetate monomer units.

5. The water-redispersible polymer powder composition of claim 1, wherein a silica sol is added to the aqueous polymer dispersion before or during drying.

6. A process for producing a water-redispersible polymer powder composition comprising polymerizing one or more ethylenically-unsaturated monomers by free-radical polymerization in an aqueous medium in the presence of protective colloid and/or emulsifier, and drying the resulting aqueous polymer dispersion after addition of protective colloid as a drying aid, wherein
    drying is carried out using as a drying aid protective colloid one or more vinyl alcohol copolymers comprising a) 80 to 99 mol % of vinyl alcohol monomer units, b) 0.5 to 10 mol % of monomer units derived from vinyl esters of unbranched or branched alkyl carboxylic acids having 3 to 18 carbon atoms, c) 0.5 to 10 mol % of monomer units derived from ethylenically-unsaturated monomers having one or more functional groups selected from the group consisting of carboxylic acid moiety, sulfonic acid moiety, quaternized amine moiety, phosphoric acid moiety, and salts thereof, and d) 0 to 5 mol % of vinyl acetate monomer units, wherein the values in mol % in each case add up to 100 mol %.

7. A mineral binder-containing building composition, comprising at least one water-redispersible polymer power composition of claim 1.

8. The mineral binder-containing building composition of claim 7, which is a sealing slurry, building adhesive, render, spackling compound, floor-filling compound, leveling compound, jointing mortar, repair mortar or crack-bridging render.

9. In a coating composition for paper and/or textile, the improvement comprising employing a water-redispersible polymer powder composition of claim 1.

10. In a process wherein sand is consolidated through the use of a polymer powder binder composition, the improvement comprising:
    employing as at least one binder, a water-redispersible polymer powder composition of claim 1.

11. The water-redispersible polymer powder composition of claim 1, wherein the vinyl alcohol copolymers comprise:
    a) 85 to 97 mol %, of vinyl alcohol monomer units,
    b) 1 to 8 mol %, of monomer units derived from vinyl esters of unbranched or branched alkyl carboxylic acids having 3 to 18 carbon atoms,
    c) 1 to 8 mol %, of monomer units derived from ethylenically-unsaturated monomers having one or more functional groups selected from the group consisting of carboxylic acid moiety, sulfonic acid moiety, quaternized amine moiety, phosphoric acid moiety, and salts thereof, and
    d) 1 to 4 mol %, of vinyl acetate monomer units, wherein the values in mol % in each case add up to 100 mol %.

12. The water-redispersible polymer powder composition of claim 1, wherein the vinyl alcohol copolymers comprise:
    a) 85 to 97 mol %, of vinyl alcohol monomer units,
    b) 1 to 8 mol %, of monomer units derived from vinyl esters of a-branched monocarboxylic acid acids having 5 to 13 carbon atoms,
    c) 1 to 8 mol %, of monomer units derived from one or more monomers selected from the group consisting of acrylic acid and methacrylic acid, maleic acid, maleic acid anhydride, crotonic acid, vinylsulfonic acid, sulfopropyl (meth)acrylate, 2-acrylamido-2-methylpropanesulfonic acid and methallyl sulfonic acid, 1-allyloxy-2-hydroxysulfonic acid, 3-sulfopropyl acrylate, 3-sulfopropyl methacrylate, bis(3-sulfopropyl) itaconate and salts thereof, and
    d) 1 to 4 mol %, of vinyl acetate monomer units, wherein the values in mol % in each case add up to 100 mol %.

13. The water-redispersible polymer powder composition of claim 1, wherein the vinyl alcohol copolymers comprise:
    a) 85 to 97 mol %, of vinyl alcohol monomer units,
    b) 1 to 8 mol %, of monomer units derived from vinyl esters of a-branched monocarboxylic acids having 9 to 10 carbon atoms,
    c) 1 to 8 mol %, of monomer units derived from one or more monomers selected from the group consisting of vinylsulfonic acid, 2-acrylamido-2-methylpropanesulfonic acid, and salts thereof, and
    d) 1 to 4 mol %, of vinyl acetate monomer units, wherein the values in mol % in each case add up to 100 mol %.

14. The water-redispersible polymer powder composition of claim 1, wherein one or more of the vinyl alcohol copolymers are applied only as drying aid and not in the polymerization.

15. The water-redispersible polymer powder composition of claim 1, wherein the vinyl alcohol copolymers are applied in a total amount of 0.1 to 20% by weight, based on the total weight of the polymeric constituents of the aqueous dispersion of the base polymer.

16. The water-redispersible polymer powder composition of claim 1, wherein the vinyl alcohol copolymers are applied in a total amount of 1 to 7% by weight, based on the total weight of the polymeric constituents of the aqueous dispersion of the base polymer.

17. The water-redispersible polymer composition of claim 1, wherein the base polymer particles are particles of an ethylene and vinyl acetate copolymer or a vinyl acetate homopolymer.

18. The water-redispersible polymer composition of claim 1, wherein the base polymer particles are copolymers of vinyl acetate with one or more of vinyl chloride and ethylene.

* * * * *